Jan. 18, 1927.
W. LEWIS
1,614,527
JARRING MOLDING MACHINE
Filed Nov. 12, 1923
2 Sheets-Sheet 1
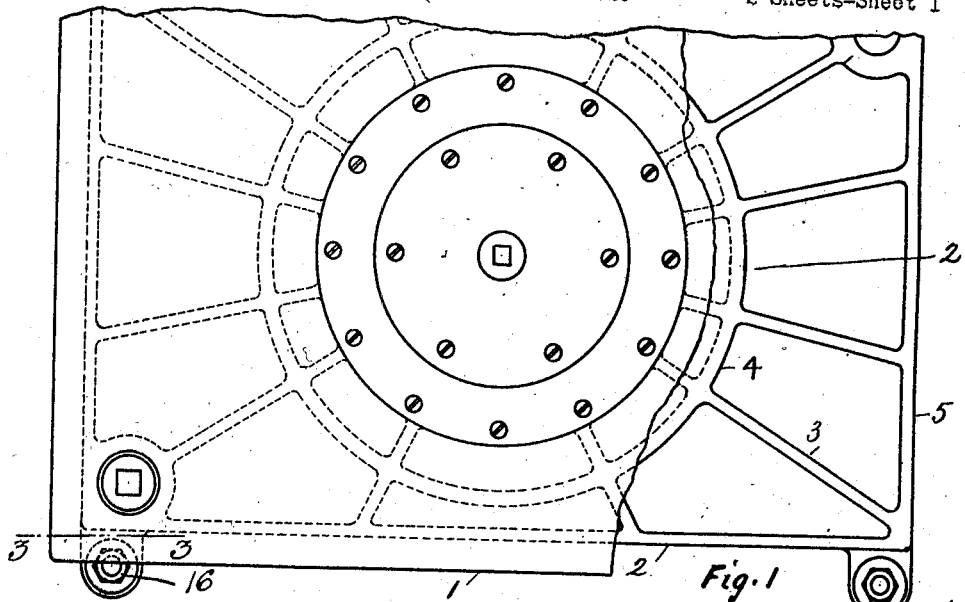
Fig.1
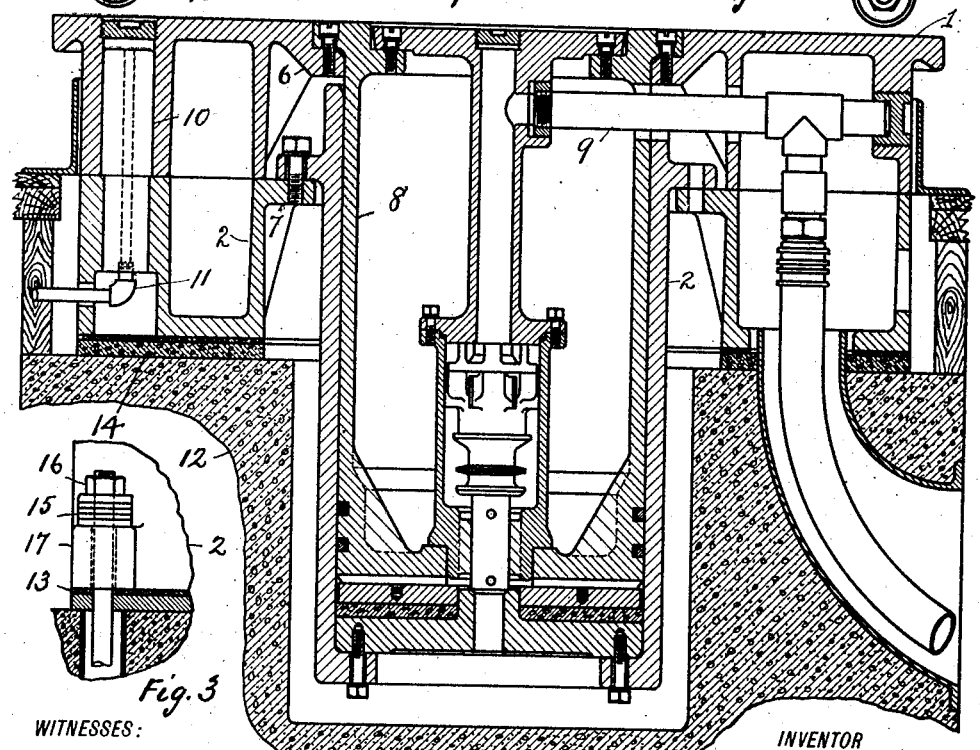
Fig.3
Fig.2
WITNESSES:
INVENTOR
Wilfred Lewis
BY
Augustus B. Stoughton
ATTORNEY Patented Jan. 18, 1927.

1,614,527

UNITED STATES PATENT OFFICE.

WILFRED LEWIS, OF HAVERFORD, PENNSYLVANIA.

JARRING MOLDING MACHINE.

Application filed November 12, 1923. Serial No. 674,185.

The principal object of the present invention is to substantially reduce the cost and weight of such machines without detracting from their efficiency and durability, and this object is accomplished by the provision of table and table support elements similar in form and design and respectively ribbed for mutual co-operation.

Other objects of the invention will appear from the following description and the invention itself will be claimed at the end hereof.

The description will be given in connection with the accompanying drawings illustrating jarring molding machines embodying features of the invention and in which—

Figure 1 is a top or plan view with parts broken away of a portion of the table and table support elements.

Fig. 2 is a transverse central section on the line 2—2 of Fig. 1.

Fig. 3 is a sectional elevation taken on the line 3—3 of Fig. 1, and

Figure 4:
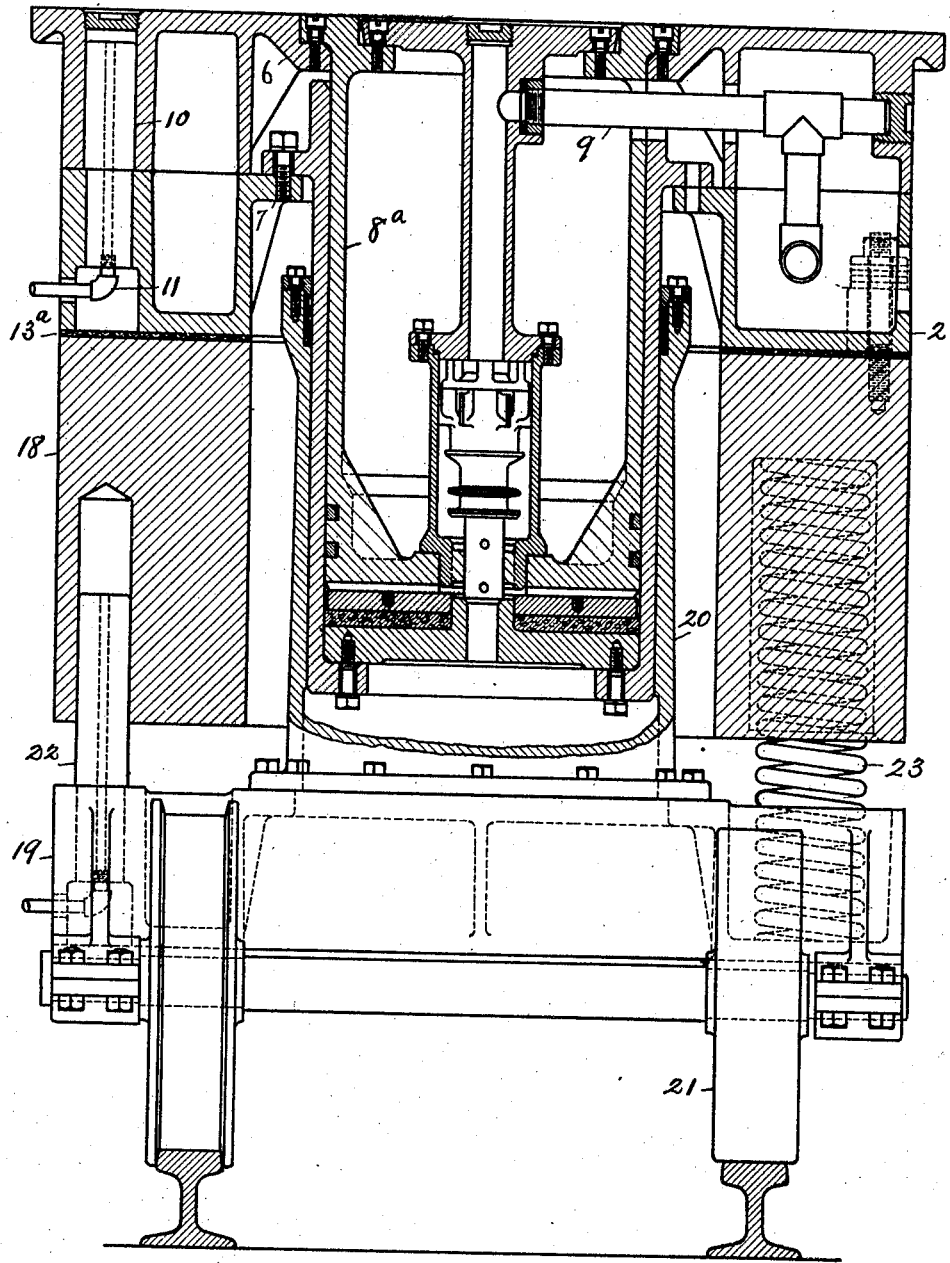
Fig. 4 is an elevational view, principally in central section, of a shockless jarring molding machine embodying features of the invention in somewhat modified form.

In the drawings the table and table support elements 1 and 2 are respectively provided with ribs arranged in confronting relation for contact with each other. As shown there are divergent ribs 3, circular ribs 4, and marginal ribs 5. These elements 1 and 2 are also provided with inwardly projecting flanges 6 and 7 arranged at openings provided therein and adapted for connection with the respective elements of an air piston and cylinder structure 8. Evidently these ribbed table and table support elements are light and strong and afford space for air connections 9, guide pins 10 and their lubricating means 11, and the like. 12 is a pit structure as of concrete or other solid material on which the table support 2 is mounted. There are pads 13, as of canvas belting, between the top of the pit structure and the bottom of the table support, perhaps, more accurately, between the latter and masses 14 of grouting poured in between the top of the pit and the face of the table support element. Similarly pads 15, as of canvas belting, are interposed between the hold-down nuts 16 and the hold-down lugs 17 provided on the table support element 2. The construction and arrangement illustrated in Fig. 4 is, as has been above described, except as follows: The cylinder structure $8^a$ is appropriate for use on a shockless jarring machine, an anvil 18 is carried by the table support element 2, and a third element 19 provided with ribs and substantially the same as the elements 1 and 2 is provided to carry the guide 20 of the piston cylinder structure $8^a$. This third ribbed element 19 is shown as mounted on wheels 21 but they are not material. 22 are guides and 23 are the springs for the anvil structure. A pad $13^a$ is shown as interposed between the element 2 and the anvil 18.

The pads 13 and 15, shown in the construction of Figs. 2 and 3, protect the concrete material of the pit in such a way that the described ribbed elements may operate to effect jar-ramming of the mold.

It will be obvious to those skilled in the art that modifications may be made in details of construction and arrangement and mere matters of form without departing from the spirit of the invention which is not limited to such matters or otherwise than the prior art and the appended claims may require.

I claim:

1. A jarring molding machine having table and table support elements respectively and integrally provided with a duplicate network of continuous ribs arranged in confronting relation for contact with each other as a striking face, said ribs extending over substantially the entire areas of the table and table support elements and projecting beyond all parts of the bodies thereof, and a piston and cylinder structure of which the elements are respectively connected with the table and table support.

2. In a jarring molding machine the combination of table and table support elements respectively provided with ribs arranged in confronting relation and with central openings having inturned flanges, and piston and cylinder elements respectively connected with said flanges.

WILFRED LEWIS.